April 17, 1951 R. W. JONES 2,549,688

MAGNETO PARTY LINE ADAPTER

Filed Oct. 18, 1947 3 Sheets-Sheet 1

INVENTOR.
ROY W. JONES
BY
Chas. W. Candy
ATTORNEY

April 17, 1951 R. W. JONES 2,549,688

MAGNETO PARTY LINE ADAPTER

Filed Oct. 18, 1947 3 Sheets-Sheet 2

INVENTOR.
ROY W. JONES

BY Chas. W. Candy

ATTORNEY

April 17, 1951 R. W. JONES 2,549,688

MAGNETO PARTY LINE ADAPTER

Filed Oct. 18, 1947 3 Sheets-Sheet 3

INVENTOR.
ROY W. JONES

BY Chas. W. Candy.

ATTORNEY

Patented Apr. 17, 1951 2,549,688

UNITED STATES PATENT OFFICE 2,549,688

MAGNETO PARTY-LINE ADAPTER

Roy W. Jones, Rochester, N. Y., assignor to Automatic Electric Laboratories, Inc., Chicago, Ill., a corporation of Delaware.

Application October 18, 1947, Serial No. 780,613

11 Claims. (Cl. 179—27)

This invention relates, in general, to telephone systems and, more particularly, to a magneto adapter circuit whereby connections may be established between magneto subscriber lines and automatic subscriber lines in the same exchange.

The object of this invention is to provide a novel and improved magneto line adapter circuit which will allow use of magneto equipment with automatic exchanges in a more efficient manner.

A feature of the invention is the manner in which a magneto subscriber may seize the adapter circuit to effect a connection to the operator's position by a single ring of his associated magneto and prevent extension of the call to the operator by a second ring of the magneto.

A further feature is the manner in which a two step differential relay is used in the magneto adapter circuit to establish connections over the adapter circuit to the operator's position, the relay being responsive to operate on termination of the ringing signal transmitted by a subscriber.

Another feature is the manner in which a first ring by the subscriber initiates a call to the operator's position and busies the adapter circuit to seizure from the operator's position, and a second ring by the subscriber within a predetermined time prevents the completion of the connection to the operator's position and maintains the adapter circuit busy to seizure by the operator's position until such time as the subscriber initiating the call restores his receiver, whereby subscribers local to the line may carry on conversations without the possibility of interruption by the operator.

An additional feature is the manner in which a magneto subscriber may complete a call to the operator's position over the adapter and the operator may dial back over the adapter to complete a connection to an automatic subscriber.

A further feature is the manner in which the magneto subscriber may complete a call to the operator over the adapter circuit, the operator may dial back over the adapter circuit to an automatic exchange to complete a three way connection in the magneto adapter between the magneto subscriber, the operator, and the automatic subscriber.

Figure 1:
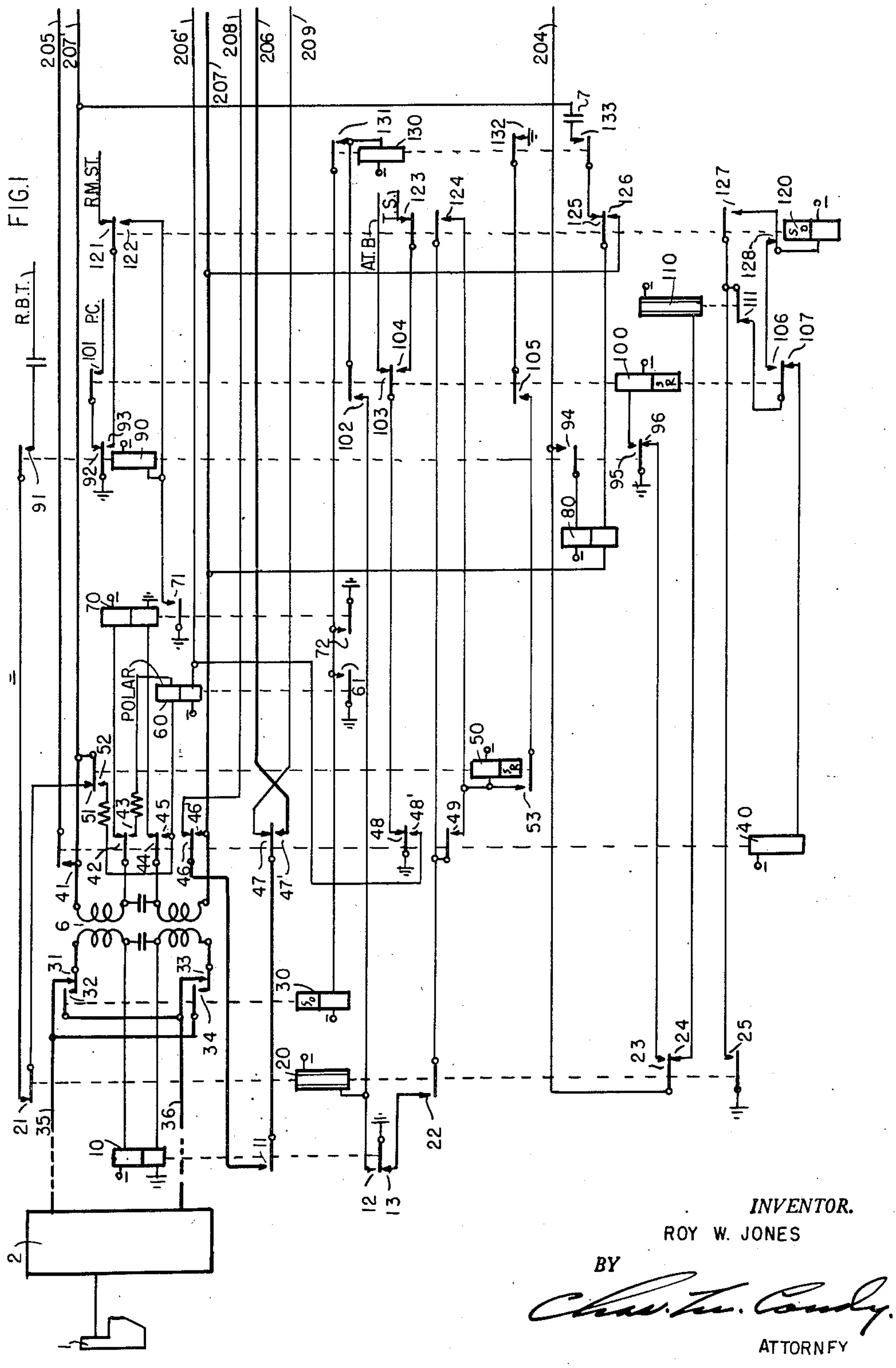
Figure 2:
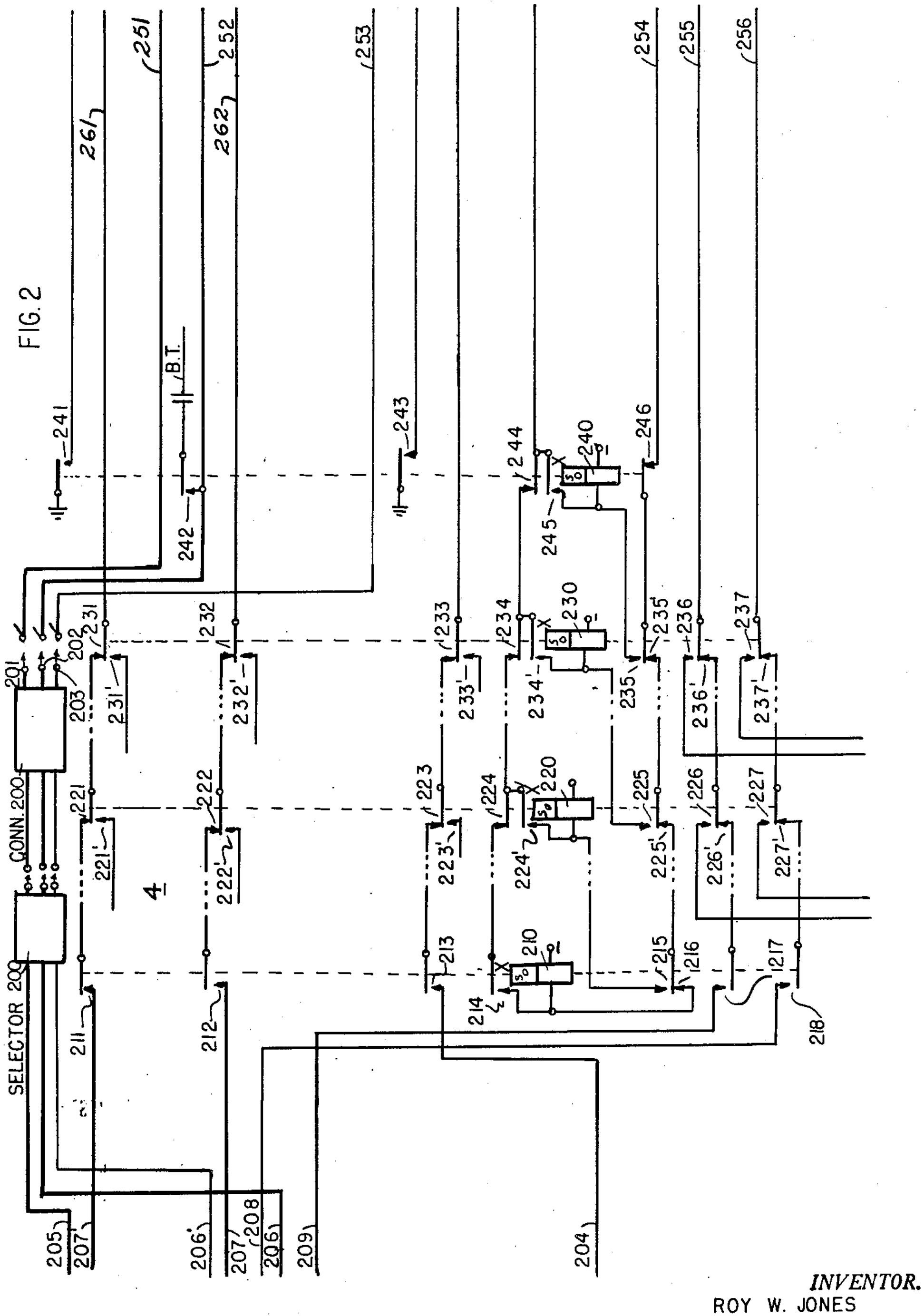
Figure 3:
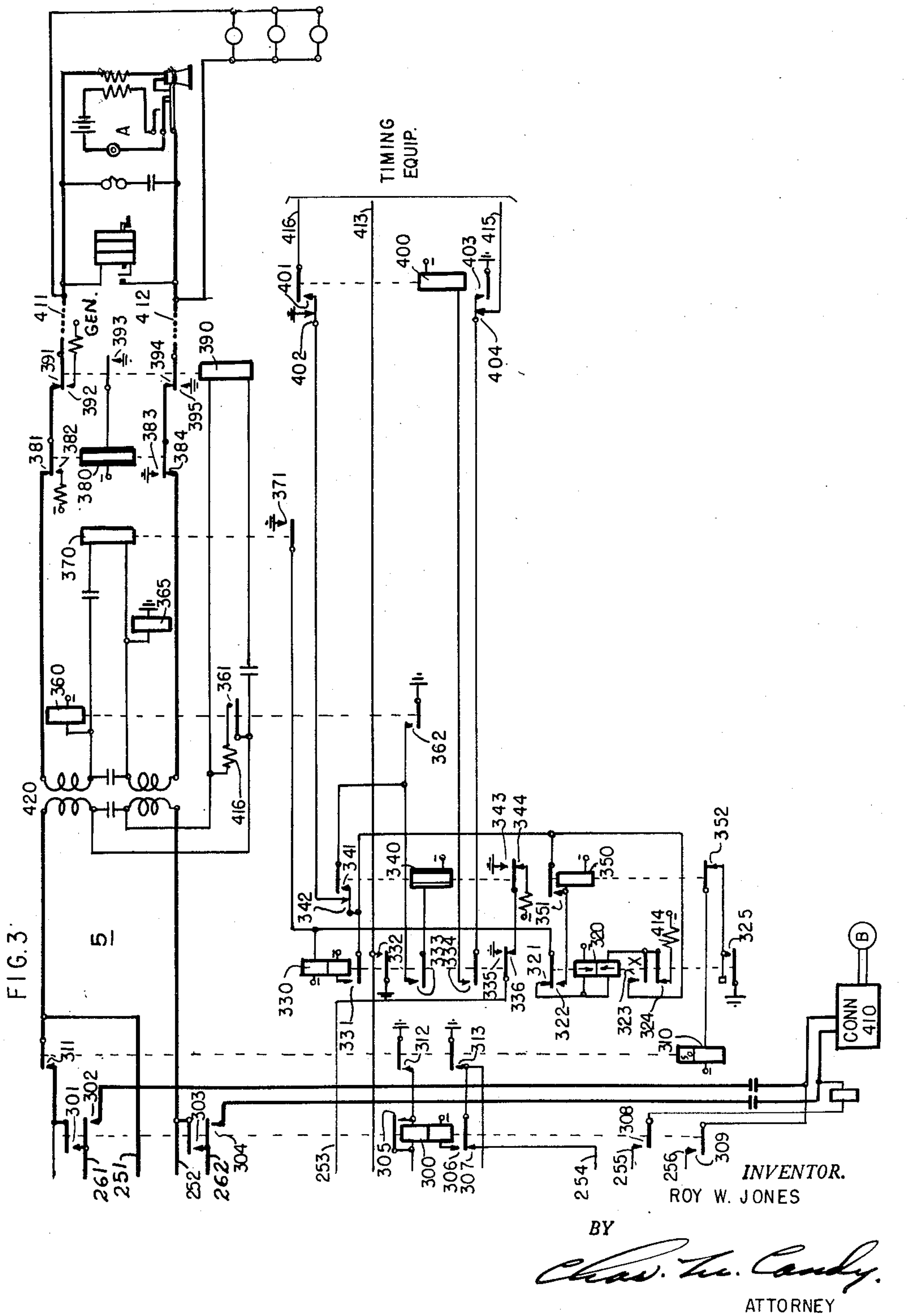

Further features will be apparent from the following specification, having reference to the accompanying drawings comprising Figures 1, 2, and 3 which illustrate one of a plurality of magneto lines and the adapter circuit individual to each line which is associated with an automatic exchange. Calls initiated by a magneto subscriber, such as A, to automatic subscriber lines or to other magneto lines terminating in the automatic exchange are completed by an operator located at a distant exchange. A single ring, of any time duration by a magneto subscriber, will signal the operator. Calls are completed between magneto subscribers on the same line by the calling magneto subscriber ringing the proper called subscriber code signals without signalling the operator.

More specifically, Figure 1 discloses an manual operator's position 1, a trunk circuit 2, and a standard two-way repeater 3 which includes minor modifications to enable use of the repeater in establishing dial-back connections.

Figure 2 illustrates a selector 200′ which is of the well known Strowger type, a connector 200 and associated code selecting and ringing equipment of the type shown and described in the patent to Arthur J. Ray, 1,502,877, issued July 29, 1924, and one of a plurality of trunk selecting relay sets 4, each relay set being individual to an adapter. The trunk selecting relay set is similar in operation and arrangement to the trunk hunting circuit described in the Patent 2,023,239, issued December 3, 1935 to John E. Ostline. The set shown is used in conjunction with the magneto line adapter 5 to select an idle one of a plurality of trunk circuits similar to the repeater circuit illustrated in Figure 1, in establishing a call from a magneto subscriber A to party B in the associated automatic exchange.

Figure 3 illustrates a magneto line adapter circuit, individual to a magneto line, which comprises a plurality of subscriber substations similar to the one designated as subscriber A. The figure further shows a standard Strowger type connector switch 410 over which calls may be completed to automatic subscribers, such as B. The magneto line adapter circuit includes a series of relays arranged to operate responsive to seizure by connector 200 over lines 251, 252, and 253, or to an operation by a magneto party line subscriber initiating a call over conductors 411 and 412. This adapter is effective to extend a call from the magneto line 411 and 412 to the operator at the manual switchboard over the associated trunk selecting relays 4 and trunk circuits 2 and 3 or to extend an incoming call received over trunk circuits 2 and 3, selector 200′, and connector 200 to the magneto line and to provide repeated code ringing to the magneto subscriber lines.

Referring now to the operation of the exchange, a call from magneto subscriber A to an automatic subscriber B in the local exchange by way of the operator's position 1 at a distant exchange will be considered first. The magneto subscriber A applies ringing current to the line in a well known manner for any desired time interval, with the receiver in the restored position, the duration of the time interval of the ringing signal being immaterial to the operation of the adapter providing the duration is of sufficient time to effectively operate relays 370 and 330. The circuit is thereby completed to relay 370 over contacts 381 and 384, 391 and 394, conductors 411 and 412 and the hand magneto generator set. Relay 370 operates during the time interval that the generator current is applied and at its contacts 371 completes an operating circuit to relay 330 and an energizing circuit to the upper and lower windings of relay 320. Relay 330 operates and at its contacts 331 completes a self holding circuit over contacts 342 and 402, at its contacts 332 applies ground to the timer start lead 413 to set the timer equipment in operation, at its contacts 333 prepares an operating circuit for relay 340, at its contacts 334 prepares an operating circuit for relay 400, at its contacts 335 applies ground to the C lead 253 of connector 200 to prevent seizure of the adapter circuit over lines 251, 252, and 253, and at its contacts 336 opens battery potential source connected to lead 253 for use in conjunction with connector 200. The upper winding of relay 320 is energized over contacts 371 and 321 in opposition to the lower winding of relay 320 which is energized over resistance 414 and contacts 324, 321 and 371. The windings are balanced moreover, so that the relay will not operate so long as both windings are energized. When the subscriber terminates operation of the magneto generator, relay 370 releases and at its contacts 371 opens the operating circuit to relay 330 and the energizing circuits to relay 320. Relay 330 holds over the self holding circuit heretofore described. When the energizing circuit is opened to relay 320, the inductive kick is sufficiently strong to close contacts 323 whereupon an operating circuit is completed to relay 320 connecting the upper and lower windings in series and extending over contacts 323, 342, and 402. The upper and lower windings of relay 320 now aid each other to effectively operate relay 320. Relay 320 operates and at its contacts 321 further opens the initial energizing circuit, at its contacts 322 prepares a circuit to relay 350, at its contacts 324 opens a further point in the initial energizing circuit for the lower winding of relay 320, and at its contacts 325 will actuate the weighted contact so that it will vibrate for approximately 3 seconds. In the event that the subscriber operates his magneto generator a second time within 3 seconds of the first ring, relay 370 will reoperate and at its contacts 371 complete an operating circuit to relay 330, which is held in the operated condition over the self holding circuit previously described, and to relay 350 over contacts 371 and 322. Relay 350 operates and at its contacts 351 completes a self holding circuit over contacts 351, 342, and 402, and at its contacts 352 opens a point in the circuit to relay 310 before the circuit is closed by weighted contact 325 coming to rest. A third ring by the calling party or a second calling party will be ineffective in the adapter.

As described previously, the adapter circuit is rendered busy to calls from the operator's position responsive to the first ring by the subscriber. The second ring prevents operation of the adapter circuit in extending the call to the operator's position and renders the circuit nonresponsive to subsequent rings.

This adapter obviously lends itself to an arrangement whereby a single ring of any duration will effect operation of the adapter to connect the magneto subscriber to the operator and a series of rings of any number exceeding one can be used to effect a code ringing arrangement between the subscribers connected to the line without the necessity of first ringing the operator to establish a reverting call and without the danger of having an operator attempting to complete a call to the magneto line while in use by a pair of subscribers connected thereto.

After a short predetermined period of time, the timing equipment, which was started when relay 330 operated, will transmit a grounded pulse over lead 415 in a well known manner. An operating circuit is thereby completed for relay 400 over contacts 334 and 404 and the timer lead 415. Relay 400 operates and at its contacts 401 and 402 transfer the holding ground for the adapter to the timer equipment, and at its contacts 403 and 404 completes a self holding circuit over contact 334. When the predetermined time for a call has expired, the timer ground will be removed from the lead 416. Relays 330, 320, 350, and 400 restore and the adapter is in normal restored condition.

Assuming now that the subscriber operated his hand generator only once, relays 330 and 320 are operated as heretofore described, and after approximately 3 seconds the weighted contact 325 comes to rest and completes an operating circuit to slow to operate relay 310 over contacts 325 and 352. Relay 310 operates and at its contacts 311 prepares a point in the talking circuit, at its contacts 312 prepares an operating circuit for the test relay 300 and at its contacts 313 completes an operating circuit to trunk hunting relay 210. Relay 210 operates and at its contacts 214, which are arranged to operate before the remaining contacts on relay 210, completes a self holding circuit over contacts 214, 224, 234, 244, and 313, at its contacts 211 and 212 prepares a talking circuit, at its contacts 213 connects the C lead 204 to the trunk circuit, at its contacts 215 completes an operating circuit to relay 220 which is slow to operate, at its contacts 216 opens its own operating circuit, and at its contacts 217 and 218 prepares a part of the dial back circuit. If the first trunk circuit is not busy, the testing lead 204 is connected to battery as described hereinafter. If the first trunk circuit is busy, there will be an absence of battery or ground on the testing lead 204, and after a short interval, relay 220 will operate. Relay 220 at its contacts 224', which are arranged to operate first, completes a self holding circuit over contacts 224', 234, 244 and 313, at its contacts 221 and 222 opens a point in the incomplete talking circuit, at its contacts 221' and 222' prepares a point in the talking circuit to the second trunk circuit, at its contacts 223' connects the testing test relay 300 to the second trunk circuit (not shown), at its contacts 224 opens the holding circuit to relay 210, at its contacts 225 completes an operating circuit to slow to operate relay 230, at its contacts 226 and 227 prepares a point in the dial back circuit from the second trunk repeater, and at its contacts 226' and 227' opens a further point in the incomplete dial back circuit from the first trunk circuit. If the second trunk circuit is busy, relay 230 operates after a brief interval in a manner similar to relays 210 and 220. If the third trunk circuit (not shown) is busy, relay 240 will operate over the circuit comprising contacts 313, 307, lead 254, contacts 246 and 235, and at its contacts 245, which are arranged to operate first, completes a self holding circuit over contacts 313, at its contacts 241 and 242 applies busy tone to the line, at its contacts 243 connects a multiple ground to the timer start lead to insure proper release of the adapter circuit, at its contacts 244 opens the holding circuit to relay 230, and at its contacts 246 opens its operating circuit. After a predetermined interval of time, the magneto adapter set will be restored in the manner heretofore described, and relay 310 at its contacts 313 opens the holding circuit to relay 240 which restores and the trunk hunting circuit is in normal restored condition.

In the event that the first trunk circuit is not busy, the test lead 204 will be connected to battery over relay 110 and contacts 24, whereupon the upper winding of relay 300 will energize and effect operation of same prior to the operation of the slow to operate relay 220. Relay 300 at its contacts 301 and 303 completes a talking circuit from the magneto line adapter to the trunk circuit, at its contacts 302 and 304 prepares a talking circuit for the called automatic subscriber over the connector 410, individual to the adapter. At its contacts 305, relay 300 completes a short circuit for its upper winding, at its contacts 306 completes a self-holding circuit over contacts 313, at its contacts 307 opens the operating circuit to slow to operate relay 220 before it can operate, and at its contacts 308 and 309 prepares the dial-back pulsing circuit to connector 410.

When the calling party removes his receiver subsequent to application of the generator ringing current, relay 360 will operate responsive to the completion of the loop circuit through the substation. Relay 360 at contacts 361 prepares a loop circuit including talking conductors 261 and 262 for repeater relay 70.

Repeater 3 is a standard type repeater and only such features as are necessary to operation of the repeater is establishing a call will be referred to in the specification, further operation of the circuit being well known to those versed in the art. Relay 110 operates over the circuit comprising contacts 24, lead 204, contacts 213, 223, and 233, 305 and 312, and at its contacts 111 opens a point in the operating circuit to relay 40 to prevent seizure of the trunk circuit by the operator while in use by a magneto subscriber. At the same time a loop circuit has been completed for relay 70 over contacts 42 and 44, the right hand windings of repeater 6, contacts 211 and 212, 221 and 222, 231 and 232, 301 and 303, 311, the left hand windings of repeater coil 420 and contacts 361. Relay 70 operates and at its contacts 71 completes a circuit to relay 90 and at its contacts 72 completes an operating circuit to relay 30. Relay 90 operates and at its contacts prepares the repeater for operation and effects operation of relay 100. Relay 30 operates after a short interval and at its contacts 31, 32, 33, and 34 reverses battery over toll trunk conductors 35 and 36 to signal the operator's position 1 over trunk circuit 2. The operator answers responsive to the received signal and effects operation of relay 10 responsive to an operation at the manual board upon answering. Relay 10 at its contacts 11 completes a seizing circuit to connector 410, and at its contact 12 completes an operating circuit to relays 20 and 130. The pulsing circuit extends to connector 410 over contacts 11, 46, and 47, lines 208 and 209, contacts 217 and 218, 226′ and 227′, 236′ and 237′, lines 255 and 256, and contacts 308 and 309 to the line relay in connector 410. The operator now dials the desired number which has been offered by the magneto subscriber and the impulses are repeated at contacts 11 over the loop circuit to the line relay (not shown) of the connector, which responds in a well known manner to operate the connector and to complete the connection to the desired automatic subscriber. When the called subscriber answers a talking circuit extends from the automatic subscriber over connector 410, contacts 302 and 304, 301 and 303, 311, repeating coil 420, contacts 381 and 384, 391 and 394, and magneto lines 411 and 412 to the magneto subscriber substation. The talking circuit also includes the operator's position which is connected to the above described talking circuit over lines 261 and 262, contacts 231 and 232, 221 and 222, 211 and 212, lines 207 and 207′, repeating coil 6, contacts 32 and 34, lines 35 and 36, and trunk circuit 2 to the operator's position. Relays 10, 20, 30, 70, 90, 100, 120 and 130 in repeater 3 are in the operated condition.

When the calling magneto subscriber lifted the receiver, as previously described, a loop circuit was completed for relay 360 which operates and at its contacts 362 completes an operating circut to relay 340. Relay 340 operates and at its contacts 341 and 342 transfers the holding ground for the operated relays in the adapter to the control of contacts 362, and at its contacts 343 and 344 performs an operation not functional at this time. The parties may now carry on a conversation.

When the calling party hangs up, relay 360 releases and at its contacts 362 opens the holding circuit to relays 330, 320 and 340 which restore and effect restoration of relay 310. Relay 310 at its contacts 313 opens the holding circuit to relay 300 and to the operated trunk relay 210. The trunk relay restores and opens the operating circuit to relay 70 and connector 410. Relay 300 releases and at its contacts 301 and 303 further opens the operating circuit to relay 70 in repeater 3, at its contacts 302 and 304 opens the talking circuit to connector 410, at its contacts 306 further opens its self holding circuit and at its contacts 308 and 309 further opens the pulsing circuit to connector 410. The line relay in connector 410 and relay 70 release. Relays 90, 30, 130, and 100 release. Relays 10, 20 and 120 release responsive to an operation by the operator to thereby restore the exchange to its normal restored condition.

Assuming now that the operator is to complete a call to subscriber A. The call is iniated by an operation at the operator's position which seizes trunk circuit 2 and repeater 3 whereby a loop circuit is completed in a well known manner to line relay 10 in the repeater. Relay 10 operates and at its contacts 11 prepares a pulsing circuit to selector 200′, at its contacts 12 completes an operating circuit to relay 20, and at its contacts 13 opens a circuit having no function at this time. Relay 20 operates and at its contacts 21 opens a point in the ring-back tone circuit, at its contacts 23 and 24 busies the repeater to seizure from the opposite direction by disconnecting the test lead from a source of battery and substituting ground, and at its contacts 25 completes an operating circuit to relay 40. Relay 40 operates and completes a loop circuit to the line relay (not shown) in selector 200' over conductor 205, contact 41, upper right hand winding of the repeating coil 6, contacts 43, upper winding of relay 60, contacts 45, lower right hand winding of repeating coil 6, contacts 46', 11, 47', line 206, and the line relay of the selector. At its contacts 48' relay 40 completes a circuit to the polarizing winding of relay 60 in opposition to its upper winding, the relay therefore being ineffective to operate at this time. The selector 200' operates in a well known manner responsive to the first digit dialed by the operator, to extend the connection to one of a group of connectors similar to connector 200. The connector 200 and its associated code selecting and ringing equipment are seized and operation of same is effected in the manner described in the Patent 1,502,877 previously referred to, responsive to the second and third digits transmitted by the operator. If the magneto line adapter is busy, ground will be returned over contact 335 as heretofore described and busy tone will be transmitted to the operator by the connector. If the magneto line adapter is idle, battery will be connected to the connector switch over contacts 344 and 336, and conductor 253 to prepare the code ringing equipment as described in the patent previously referred to, which operates responsive to the fourth and fifth digits transmitted to apply ringing current to conductors 201 and 202. Relay 390 operates over the left hand winding of repeater coil 420 responsive to the code ringing signals transmitted. Relay 390 at its contacts 392 and 395 repeats the code to the party line over conductors 411 and 412. When the called party answers, relay 360 operates as heretofore described and at its contact 361 inserts resistance 416 in bridge of the connector ringing circuit. Ringing by the connector is terminated responsive thereto and the talking circuit is extended through to the called station.

When the call is completed, and the operator disconnects, trunk circuit 2, repeater 3, selector 200' and connector 200 release in a well known manner. Release of the magneto line adapter circuit is accomplished on restoration of the receiver by the magneto subscriber in the manner heretofore described.

While a particular embodiment of the invention has been described, it will be understood that various modifications may be made therein which are within the true spirit and scope of the invention.

What is claimed is:

1. In a telephone system, a line comprising a plurality of magneto subscriber substations, a hand generator accessible to each subscriber for applying ringing current to said line, a magneto line adapter circuit individual to said line, an operator's position, means in said adapter circuit for extending a connection to said operator's position responsive to a single application of ringing current to the line by a subscriber, and means responsive to a second application of ringing current to the line by said subscriber to prevent said adapter from extending the call to the operator.

2. In a telephone system, an operator's position, a line comprising a plurality of magneto subscriber substations, each substation being assigned a code ring consisting of more than a single ring, a hand generator accessible to each subscriber for transmitting signals over said line, a magneto line adapter circuit individual to said line, an incomplete connection, means in said adapter operated responsive to a single ring of any duration by a calling subscriber for completing said connection to extend the call to said operator's position, means in said adapter accessible to said operator's position for at times extending a call to said line, means operated at other times responsive to a plurality of rings corresponding to the code ring of a called subscriber on said line by said calling subscriber to prevent extension of the call to the operator's position, and means included in said last mentioned means responsive to a first ring of any duration of said plurality of rings to prevent said operator from seizing said line while being so used by said calling subscriber and said called subscriber on said line.

3. In a telephone system, an automatic exchange, a plurality of automatic subscriber lines terminating in said exchange, a magneto line comprising a plurality of magneto subscriber substations associated with said exchange, a magneto line adapter individual to said magneto line including a first and second path, an operator's position connected to said exchange, means controlled by said magneto subscribers for establishing a connection to said operator's position over said first path in said magneto line adapter, and means controlled by said operator for further extending a connection from said operator's position to one of said automatic subscriber's lines over said second path in said magneto line adapter.

4. In a telephone system, an automatic exchange, a plurality of automatic subscriber lines terminating in said exchange, a magneto line comprising a plurality of magneto subscriber substations, a magneto line adapter individual to the magneto line, an operator's position connected to said exchange, means controlled by an operation by a magneto subscriber for establishing a connection from said magneto line to said operator's position, and means in said adapter operated responsive to the operation of said first means to prepare a three-way talking connection in said adapter including said magneto subscriber substation, said operator's position, and one of said automatic subscriber's lines, and means controlled by said operator for completing said three way connection.

5. In a telephone system, an automatic exchange, automatic switches in said exchange, a magneto line, an adapter circuit individual to said line, first, second, and third paths in said adapter, an operator's position connected to said exchange, means for seizing said adapter over said magneto line, means in said adapter operated responsive to seizure to extend the line to said operator's position over the first of said paths and to prepare a pulsing circuit from said operator's position to one of said automatic switches for establishing a connection over said second path, and means controlled by said operator for operating one of said automatic switches for completing a three way connection through said adapter circuit including said first and third paths.

6. In a telephone system, an automatic exchange, a plurality of automatic subscriber lines, an operator's position connected to said exchange, a magneto line comprising a plurality of magneto subscriber substations, a magneto adapter circuit individual to said magneto line, means controlled by calling magneto subscribers for seizing said adapter circuit, a plurality of trunk circuits, a trunk hunting circuit individual to the magneto adapter operated responsive to seizure of the adapter to select an idle one of said trunks and extend a connection from said magneto line to said operator's position, a connector switch associated with said automatic subscriber lines individual to said magneto adapter, and means controlled by the operator for completing a call over said adapter and said connector to one of said automatic subscriber lines.

7. In a telephone system, an automatic exchange, a plurality of automatic switches in said exchange, a magneto line comprising a plurality of subscriber substations, a magneto adapter having a first, second, and third paths, a trunk hunting circuit comprising a first and second paths, a plurality of trunk circuits, an operator's position connected to said exchange, means controlled by said magneto subscribers for completing a call over said first paths in said magneto adapter and in said trunk hunting circuit and over one of said trunk circuits to said operator's position, means controlled by said operator for further extending said call over said one trunk circuit said second paths of the adapter and of the trunk hunting circuit to one of said automatic switches, and means controlled by said operator for operating said one switch over said latter path for completing a three way talking connection over said one trunk circuit, said first path in said trunk hunting circuit, and said first and third paths in said adapter circuit.

8. In a telephone system, a magneto line comprising a plurality of magneto substations, a magneto line adapter circuit, an operator's position, means for seizing said circuit over said magneto line and transmitting signals thereover, a differential two-step relay prepared to operate on reeipt of a signal over said line and operated responsive to termination of said signal, and means operated responsive to operation of said relay to connect said adapter circuit to said operator's position.

9. In a system as claimed in claim 8, a second relay, a circuit for said second relay prepared responsive to operation of said relay, said second relay operated over said second relay circuit responsive to receipt of a second signal over said line within a predetermined period of time to prevent operation of said last means, and said connection to said operator's position.

10. In a telephone system, a magneto adapter circuit, an operator's position, a magneto line comprising a plurality of magneto subscriber substations each of said substations having a hook-switch, means for seizing and transmitting signals to said adapter from said operator's position or from said magneto line, means in said adapter circuit operated responsive to a first signal of any duration received over said magneto line to extend a connection between said adapter circuit and said operator's position, busying means also operated responsive to a single signal of any duration received over said magneto line to busy the adapter to seizure by the operator, means operated responsive to a second signal received from said magneto line to prevent extension of the connection to said operator's position, and means operated responsive to the operation of the hook-switch by a subscriber on said line to control said busying means to maintain the adapter busy for preventing seizure by said operator's position while in use.

11. In a telephone system, a magneto line, an adapter circuit individual to said line, a first relay in said adapter circuit operated during the application of generator current generated by a calling subscriber on said line, a second relay in said circuit operated in response to the initial operation of said first relay, a third relay in said circuit operated in response to the release of said first relay after the termination of the initial application of generator current to said line, a fourth relay operated a predetermined time interval after the operation of said third relay, an operator's position, means controlled by the operation of said fourth relay for completing a connection from said line to said operator's position, a fifth relay operated by said first relay in response to a second application of generator current to said line, and contacts on said fifth relay operated to prevent operation of said fourth relay in case said second application of generator current is applied to said line before the expiration of said predetermined time interval.

ROY W. JONES.

REFERENCES CITED

The following references are of record in the file of this patent:

UNITED STATES PATENTS

| Number | Name | Date |
|---|---|---|
| 1,646,421 | Ray | Oct. 25, 1927 |
| 1,685,547 | Lomax | Sept. 25, 1928 |
| 1,765,619 | Saunders | June 24, 1930 |
| 1,827,061 | Anders | Oct. 31, 1931 |
| 1,851,385 | Fitzgerald | Mar. 29, 1932 |
| 1,942,404 | Ashbrook et al. | Jan. 9, 1934 |
| 2,139,247 | Stokely | Dec. 6, 1938 |